(12) United States Patent
Nakaishi

(10) Patent No.: US 12,159,307 B2
(45) Date of Patent: Dec. 3, 2024

(54) SYSTEM AND PROCESSING APPARATUS

(71) Applicant: CANON KABUSHIKI KAISHA, Tokyo (JP)

(72) Inventor: Ryosuke Nakaishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,032

(22) Filed: Nov. 22, 2022

(65) Prior Publication Data

US 2023/0093083 A1 Mar. 23, 2023

Related U.S. Application Data

(63) Continuation of application No. 16/939,852, filed on Jul. 27, 2020, now Pat. No. 11,551,286.

(30) Foreign Application Priority Data

Jul. 29, 2019 (JP) ................. 2019-139166

(51) Int. Cl.
*G06Q 30/00* (2023.01)
*G06K 7/14* (2006.01)
(Continued)

(52) U.S. Cl.
CPC ....... *G06Q 30/0637* (2013.01); *G06K 7/1408* (2013.01); *G06Q 10/087* (2013.01);
(Continued)

(58) Field of Classification Search
CPC ............. G06Q 30/0637; G06Q 10/087; G06Q 20/3276; G06Q 20/42; G06Q 30/0623; G06Q 30/0641; G06K 7/1408
See application file for complete search history.

(56) References Cited

U.S. PATENT DOCUMENTS 10,768,878 B2 * 9/2020 Somaiah ............... G06F 3/1289
11,551,286 B2 * 1/2023 Nakaishi ............. G06Q 10/087
(Continued)

OTHER PUBLICATIONS

HP LaserJet Pro MFP M28w is designed to meet small businesses' needs Business Mirror [Makati City] Apr. 29, 2019; Dialog #2216649508, 2pgs. (Year: 2019).*
(Continued)

*Primary Examiner* — Robert M Pond
(74) *Attorney, Agent, or Firm* — Canon U.S.A., Inc. IP Division

(57) ABSTRACT

A system includes a processing apparatus and a management server. The processing apparatus includes a first transmission unit configured to transmit information about a state of a consumable item for consumption by the processing apparatus. The management server includes a first generation unit configured to generate a first screen for purchasing the consumable item based on the information transmitted from the processing apparatus about the state of the consumable item, a second transmission unit configured to transmit a request for purchasing the consumable item based on a user instruction designated on the first screen displayed on the processing apparatus, and a second generation unit configured to generate a second screen containing a payment code based on information about the payment code acquired based on the request for purchasing.

8 Claims, 11 Drawing Sheets

(51) Int. Cl.
*G06Q 10/087* (2023.01)
*G06Q 20/32* (2012.01)
*G06Q 20/42* (2012.01)
*G06Q 30/0601* (2023.01)

(52) U.S. Cl.
CPC ......... *G06Q 20/3276* (2013.01); *G06Q 20/42* (2013.01); *G06Q 30/0623* (2013.01); *G06Q 30/0641* (2013.01)

(56) References Cited

U.S. PATENT DOCUMENTS

| | | | |
|---|---|---|---|
| 2013/0169996 A1* | 7/2013 | McLeod | G06F 11/0733 358/3.28 |
| 2015/0248664 A1* | 9/2015 | Makhdumi | G06Q 20/3274 235/380 |
| 2018/0082270 A1* | 3/2018 | Sun | G06Q 20/108 |
| 2018/0182021 A1* | 6/2018 | Sugamata | H04L 67/10 |
| 2020/0019943 A1* | 1/2020 | Liu | G06Q 20/322 |
| 2020/0225885 A1* | 7/2020 | Akimoto | G06Q 30/06 |
| 2020/0342440 A1* | 10/2020 | Yamada | G06Q 20/3224 |

OTHER PUBLICATIONS

HP Ink Tank 419: Forget ink woes and print at 10 paise per page (Tech Review) Arora, Nishant. IANS English [New Delhi] Jan. 8, 2019; Dialog #2164402761, 2pgs. (Year: 2019).*

* cited by examiner

{
701 ~  "serialNumber" : "AAAA11111",
702 ~  "model": "ABCZ series",
          "inkStatus": [
            {
703 ~       "color": "Cyan",
704 ~       "model": "ABC - < C >",
705 ~       "level": "80"
            },
            {
              "color": "Black",
              "model": "ABC - < Bk >",
              "level": "90"
            },
            {
              "color": "Yellow",
              "model": "ABC - < Y >",
              "level": "90"
            },
            {
              "color": "Magenta",
              "model": "ABC - < M >",
              "level": "70"
            }
          ]
        }
```

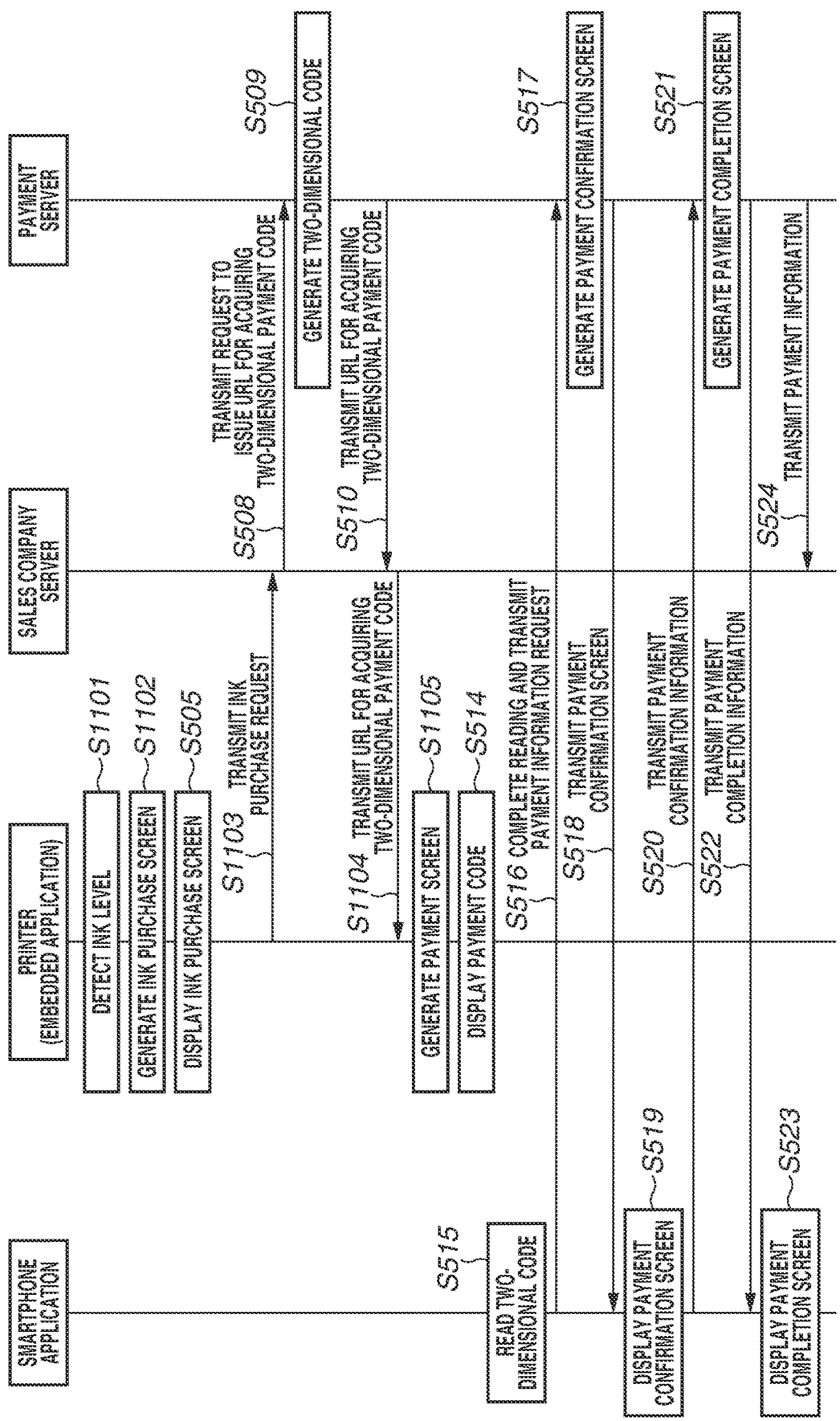

… # SYSTEM AND PROCESSING APPARATUS

CROSS-REFERENCE TO RELATED APPLICATIONS

This application is a continuation of U.S. application Ser. No. 16/939,852, which was filed on Jul. 27, 2020 and which claims priority to Japanese Patent Application No. 2019-139166, which was filed Jul. 29, 2019, both of which are hereby incorporated by reference herein in their entireties.

BACKGROUND

Field of the Disclosure

The present disclosure relates to a system and a processing apparatus. In particular, the present disclosure relates to a technique that relates to purchasing consumables.

Description of the Related Art

These days, information about a consumable item, such as an ink cartridge or toner cartridge, the information including color, model number, and remaining amount of the consumable item, and a button for requesting a purchase of a consumable item are displayed on a screen of a printer or a screen of a personal computer (PC) connected to the printer. Japanese Patent Application Laid-Open No. 2002-123384 discusses a technique that displays a state of a consumable item and a button for delivering/purchasing consumable items on a PC screen.

SUMMARY

According to an aspect of some embodiments, a system includes a processing apparatus and a management server. The processing apparatus includes a first transmission unit configured to transmit information about a state of a consumable item for consumption by the processing apparatus. The management server includes a first generation unit configured to generate a first screen for purchasing the consumable item based on the information transmitted from the processing apparatus about the state of the consumable item, a second transmission unit configured to transmit a request for purchasing the consumable item based on a user instruction designated on the first screen displayed on the processing apparatus, and a second generation unit configured to generate a second screen containing a payment code based on information about the payment code acquired based on the request for purchasing.

Further features of various embodiments will become apparent from the following description of exemplary embodiments with reference to the attached drawings.

BRIEF DESCRIPTION OF THE DRAWINGS

FIG. 7 illustrates an example of status information.
FIG. 11 illustrates a sequence diagram according to a second exemplary embodiment.

DESCRIPTION OF THE EMBODIMENTS

According to a technique discussed in Japanese Patent Application Laid-Open No. 2002-123384, after a button displayed on a screen of a personal computer (PC) is pressed by a user for delivering/purchasing a consumable item, an order screen is successively displayed to prompt the user to input purchaser information, such as postal code, and to log in with an identification (ID) and a password for online shopping. Thus, it is a time-consuming process to complete purchasing of the consumable item. The present disclosure is directed to a technique for improving convenience in purchasing consumable items.

Various exemplary embodiments of the present disclosure will be described in detail below with reference to the attached drawings. It should be noted that the below-described exemplary embodiments are not intended to limit the scope of the claims and that not every combination of features described below is always essential to a technical solution of every embodiment.

<System Configuration>

Figure 1:
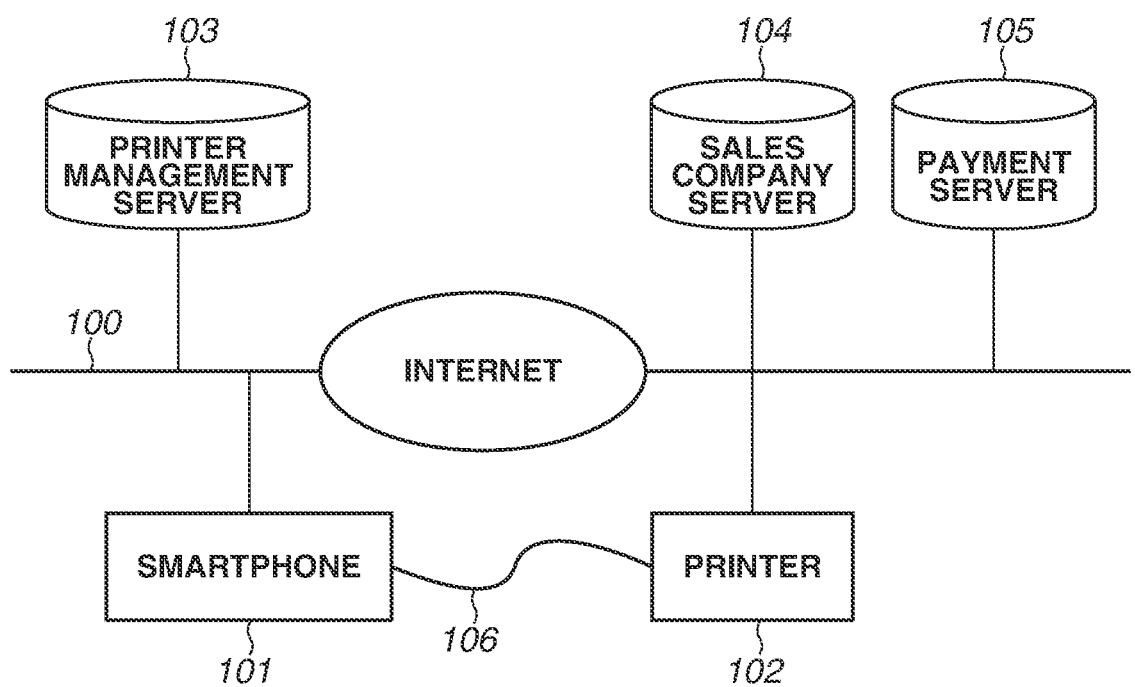
FIG. 1 illustrates an example of a system configuration.

FIG. 1 illustrates an example of a system configuration according to a first exemplary embodiment. An information processing system according to the present exemplary embodiment includes a smartphone 101, a printer 102, a printer management server 103, a sales company server 104, and a payment server 105. The smartphone 101 functions as an information processing apparatus. The printer 102 functions as an image processing apparatus. The sales company server 104 functions as a sales management server.

The printer 102 and the smartphone 101 are connectable to the Internet 100 via a router (not illustrated). Each of the printer management server 103, the sales company server 104, and the payment server 105 is connected to the Internet 100. Each communication is controlled through a protocol, such as the Hypertext Transfer Protocol (HTTP) or Extensible Messaging and Presence Protocol (XMPP). Other protocols can also be applicable.

<Hardware Configuration of Smartphone>

Figure 2:
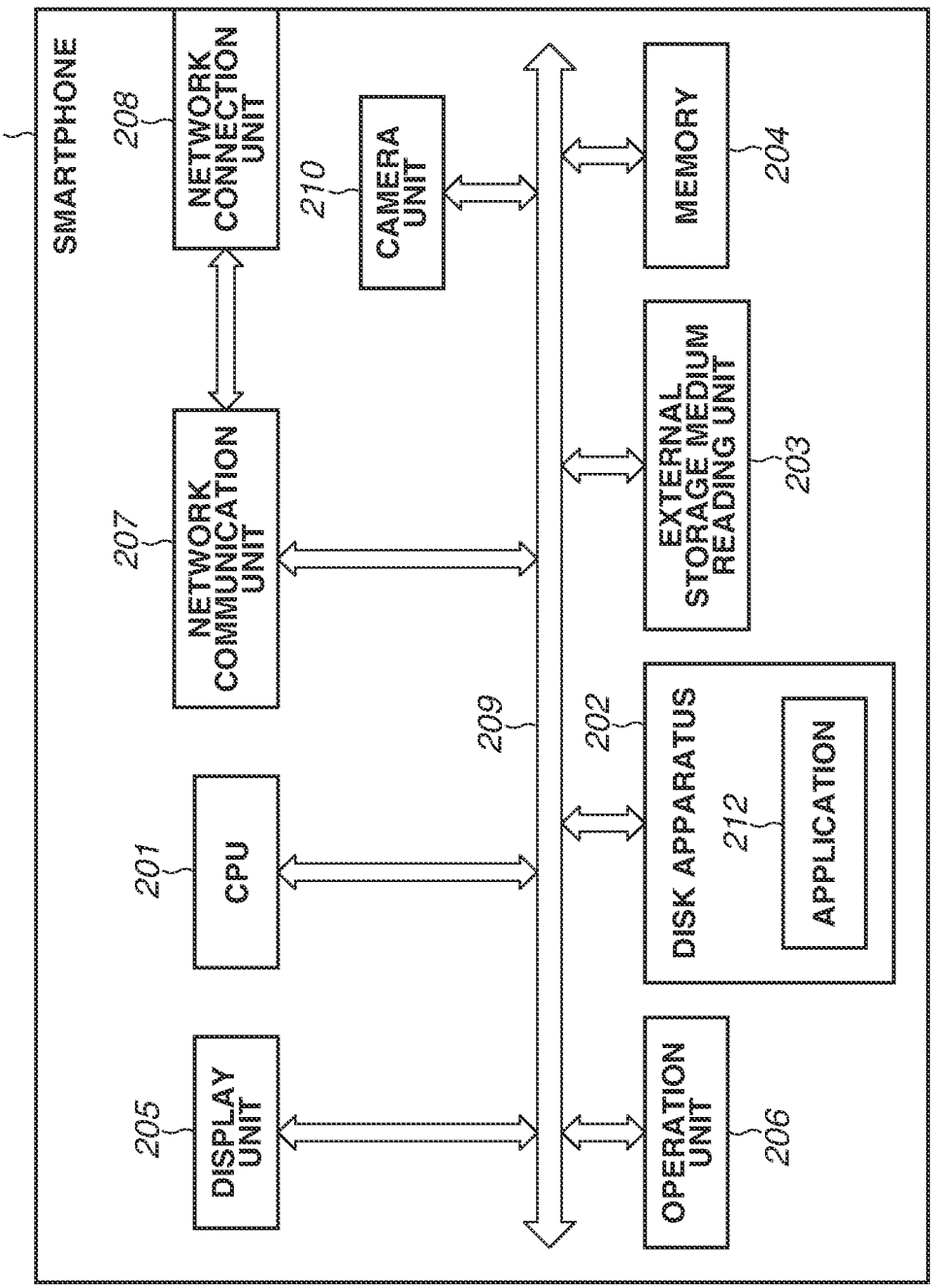
FIG. 2 is a block diagram illustrating an example of a hardware configuration of a smartphone.

FIG. 2 illustrates an example of a hardware configuration of the smartphone 101 as an example of a terminal apparatus, which functions as an information processing apparatus. The smartphone 101 includes a central processing unit (CPU) 201, a disk apparatus 202, an external storage medium reading unit 203, a memory 204, a display unit 205, and an operation unit 206. The smartphone 101 further includes a network communication unit 207, a network connection unit 208, and a camera unit 210. The terminal apparatus is not limited to a smartphone, and a mobile phone or tablet terminal is also applicable.

The CPU 201 is a central processing apparatus configured to control each component of the smartphone 101. The disk apparatus 202 stores an application 212, an operation system (OS) read by the CPU 201, and various other files. The external storage medium reading unit 203 is an apparatus configured to read data (e.g., a file) stored on an external storage medium, such as a secure digital (SD) card. The memory 204 includes a random access memory (RAM), and the CPU 201 buffers or temporarily stores data on the memory 204 as needed. The display unit 205 is, for example, a liquid crystal display (LCD) and displays various types of information. The operation unit 206 includes a touch panel, and buttons with which a user performs various input operations. The network communication unit 207 connects to a network, such as the Internet 100, via the network connection unit 208 and performs various types of communication. The network communication unit 207 supports a wireless local area network (wireless LAN). The foregoing components are connected to each other via a bus 209. The camera unit 210 includes an image sensor and lens. The camera unit 210 reads code information, such as a two-dimensional code (e.g., quick response (QR) Code®)), or a one-dimensional code (e.g., barcode).

<Hardware Configuration of Printer>

Figure 3:
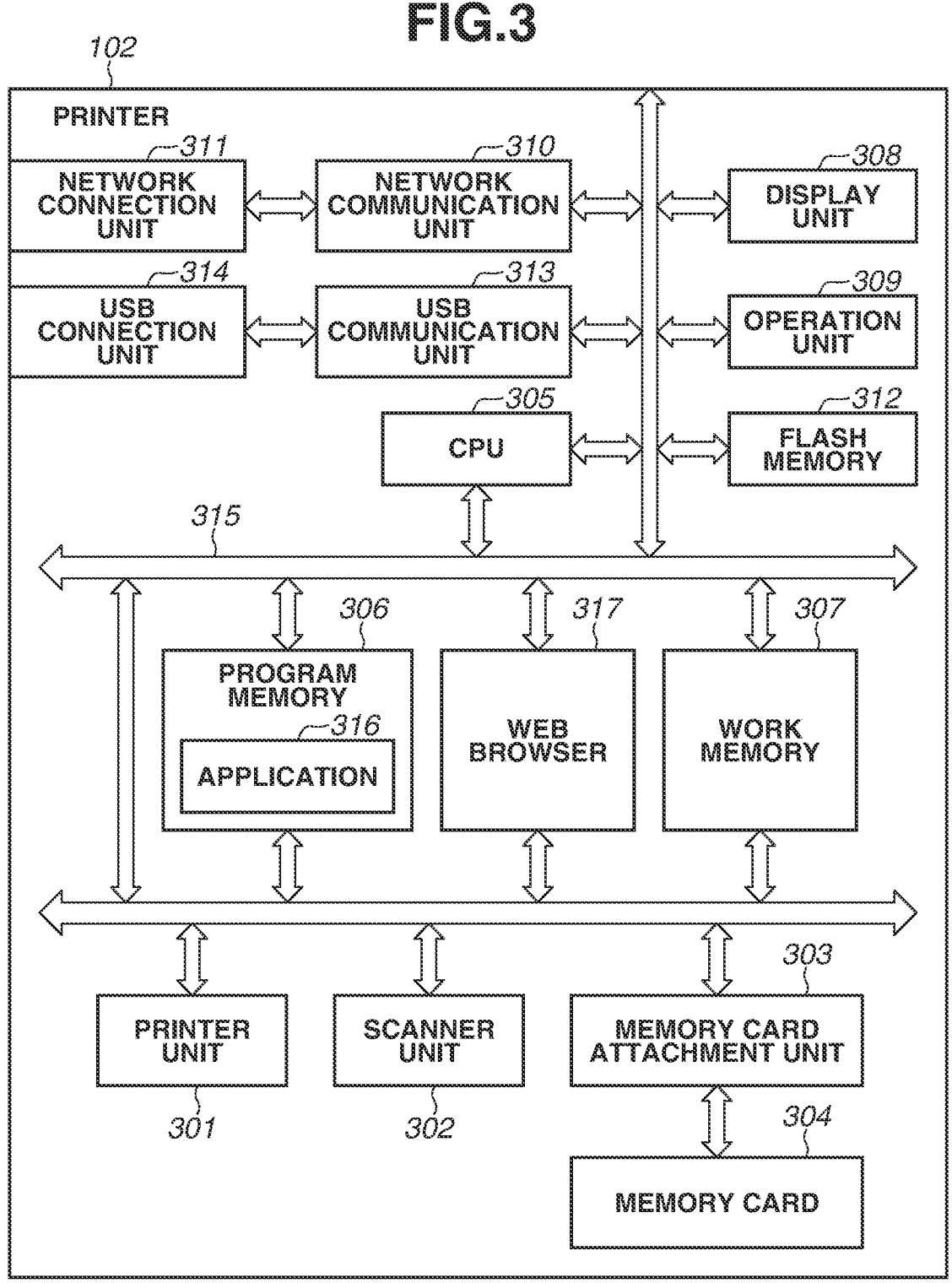
FIG. 3 is a block diagram illustrating an example of a hardware configuration of a printer.

FIG. 3 illustrates an example of a hardware configuration of the printer 102. The printer 102 includes a printer unit 301, a scanner unit 302, a memory card attachment unit 303, and a memory card 304. The printer 102 further includes a CPU 305, a program memory 306, a work memory 307, a display unit 308, an operation unit 309, a network communication unit 310, a network connection unit 311, a flash memory 312, a universal serial bus (USB) communication unit 313, and a USB connection unit 314. While the printer 102, which is a multi-function peripheral, is described as an example of an image processing apparatus in the present exemplary embodiment, the image processing apparatus can be a copying machine or facsimile machine. Alternatively, the image processing apparatus can be a printer without a scanner function. In the printer 102, a print function is realized by the printer unit 301, a scanner function is realized by the scanner unit 302, and a storage function is realized by the memory card attachment unit 303 and the memory card 304. The printer unit 301 externally receives image data, and prints, on a print sheet, the received image data and image data stored on the memory card 304 using a recording method, such as an inkjet or electrophotographic method. For example, in a case where the printer unit 301 is configured to execute printing using an inkjet method, the printer unit 301 includes an inkjet head, and an ink is supplied from an ink tank to the inkjet head through a tube. The printer unit 301 manages model number information about an ink cartridge and ink level information of the ink cartridge. The ink level information is related to ink cartridge as a consumable item for consumption by the inkjet head. The printer unit 301 acquires the remained level of ink in the ink tank by using dot counting or sensor detection method. The printer unit 301 also manages sheet information including a number of stacked sheets.

The scanner unit 302 optically reads a document set on a document platen (not illustrated), converts the read document into electronic data, and transmits the image data, which is converted to a designated file format, to an external apparatus via a network or stores the image data on a storage area (e.g., hard disk drive (HDD) (not illustrated)). Further, a copying function is realized by reading a document on the document platen with the scanner unit 302, generating image data, transferring the image data to the printer unit 301, and printing the image data on a printing sheet with the printer unit 301. On the memory card 304 attached to the memory card attachment unit 303, various types of file data are stored. The file data can be read from an external apparatus via a network and edited. The file data read from the external apparatus can be stored on the memory card 304.

The CPU 305 is a central processing apparatus configured to control each component included in the printer 102. The program memory 306 includes a read-only memory (ROM), and stores various program codes and an application 316 for communicating with a server apparatus. The application 316 accesses the printer unit 301 and acquires consumable information about consumables, such as ink cartridges and sheets. A web browser 317 displays a web page on the display unit 308. The work memory 307 includes a RAM. In the work memory 307, image data and a job log are temporarily stored or buffered when a service is executed. The display unit 308 is, for example, a LCD and displays various types of information. The operation unit 309 includes a switch with which a user performs various input operations. The network communication unit 310 connects to a network, such as the Internet 100, via the network connection unit 311 and performs various types of communication. Each communication is controlled through a protocol, such as HTTP. Other protocols can also be employed. The network communication unit 310 supports a wired LAN or wireless LAN. In a case where the network communication unit 310 supports a wired LAN, the network connection unit 311 is a connector for connecting a wired LAN cable. In a case where the network communication unit 310 supports a wireless LAN, the network connection unit 311 is an antenna. The flash memory 312 is a non-volatile memory configured to store image data received by the network communication unit 310. The USB communication unit 313 is connected to various peripheral apparatuses via the USB connection unit 314 and performs various types of communication. The foregoing components are connected to each other via a bus 315.

<Hardware Configuration of Server>

Figure 4:
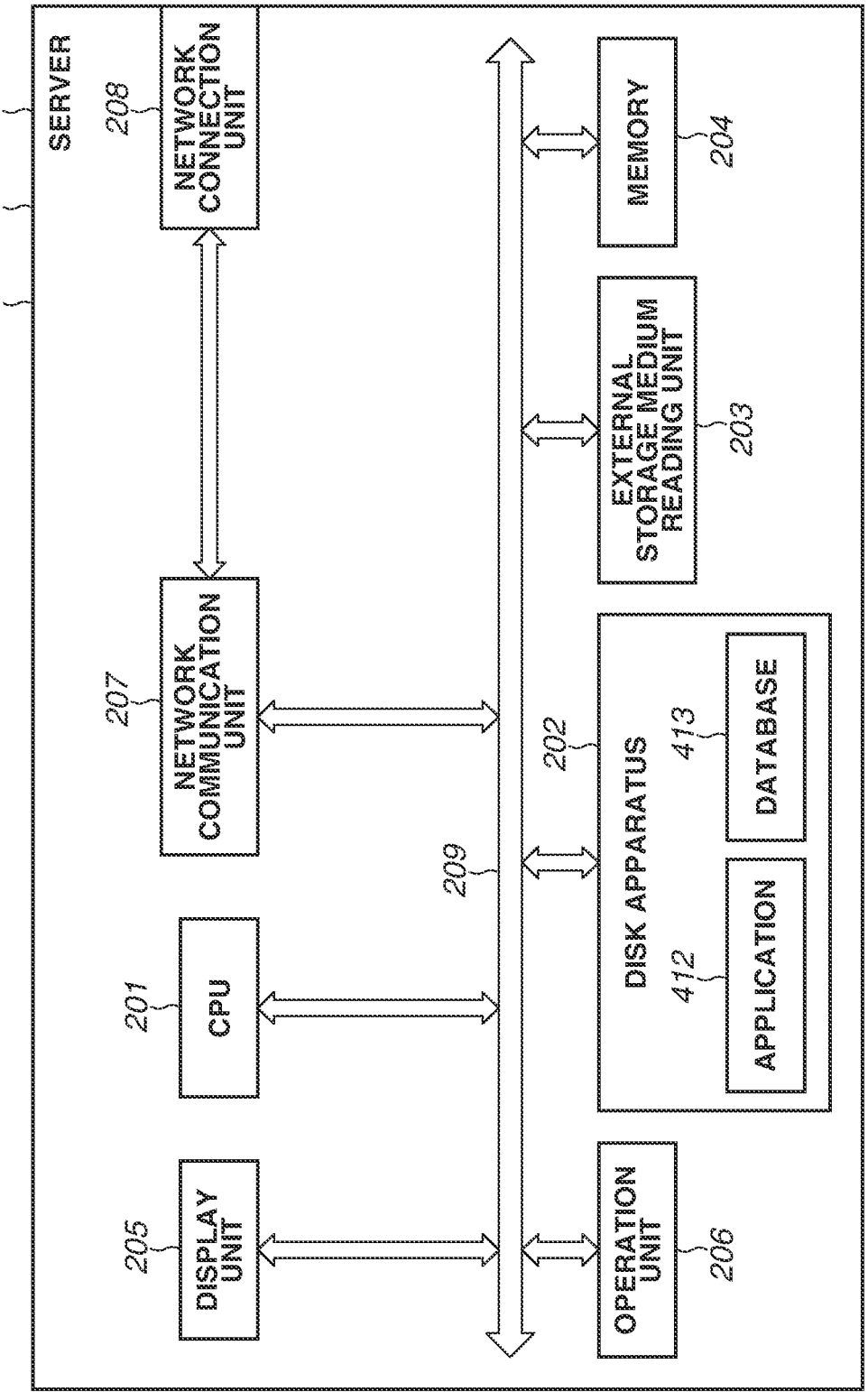
FIG. 4 is a block diagram illustrating an example of a hardware configuration of a server.

FIG. 4 is a block diagram illustrating a hardware configuration of the printer management server 103. The sales company server 104 and the payment server 105 have a similar hardware configuration. Each component similar to that of the smartphone 101 illustrated in FIG. 2 is given the same reference numeral, and description thereof is omitted. Each disk apparatus 202 of the printer management server 103, the sales company server 104, and the payment server 105 stores an application 412, a database 413, an OS read by the CPU 201, and other various files.

While the printer 102 is described as an example of a processing apparatus in the present exemplary embodiment, the present exemplary embodiment is not limited to those described above. For example, the processing apparatus can be a vacuum cleaner, refrigerator, or washing machine that uses a consumable item.

<Purchase Sequence>

Figure 5:
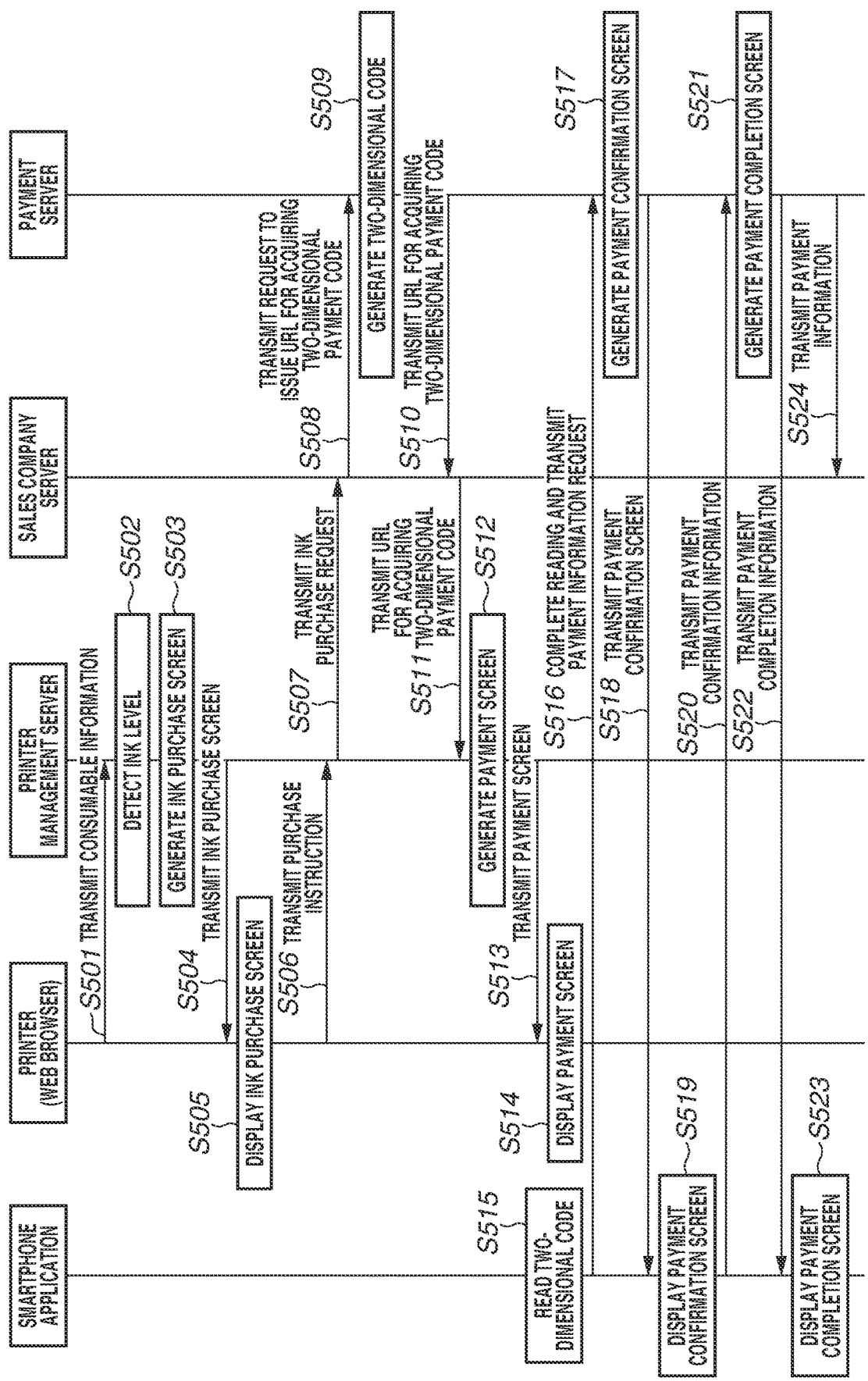
FIG. 5 is a sequence diagram according to a first exemplary embodiment.

Next, a sequence of purchasing a consumable item will be described with reference to FIGS. 5 to 8. FIG. 5 is a sequence diagram illustrating an example of a process of purchasing a consumable item by using a two-dimensional code payment method.

In S501, the printer 102 transmits consumable information to the printer management server 103 via the Internet 100. The consumable information includes the model number information as identification information about the consumable item and the ink level information as information about the state of the consumable item. The processing executed in S501 will be described in detail with reference to FIGS. 6 and 7.

Figure 6:
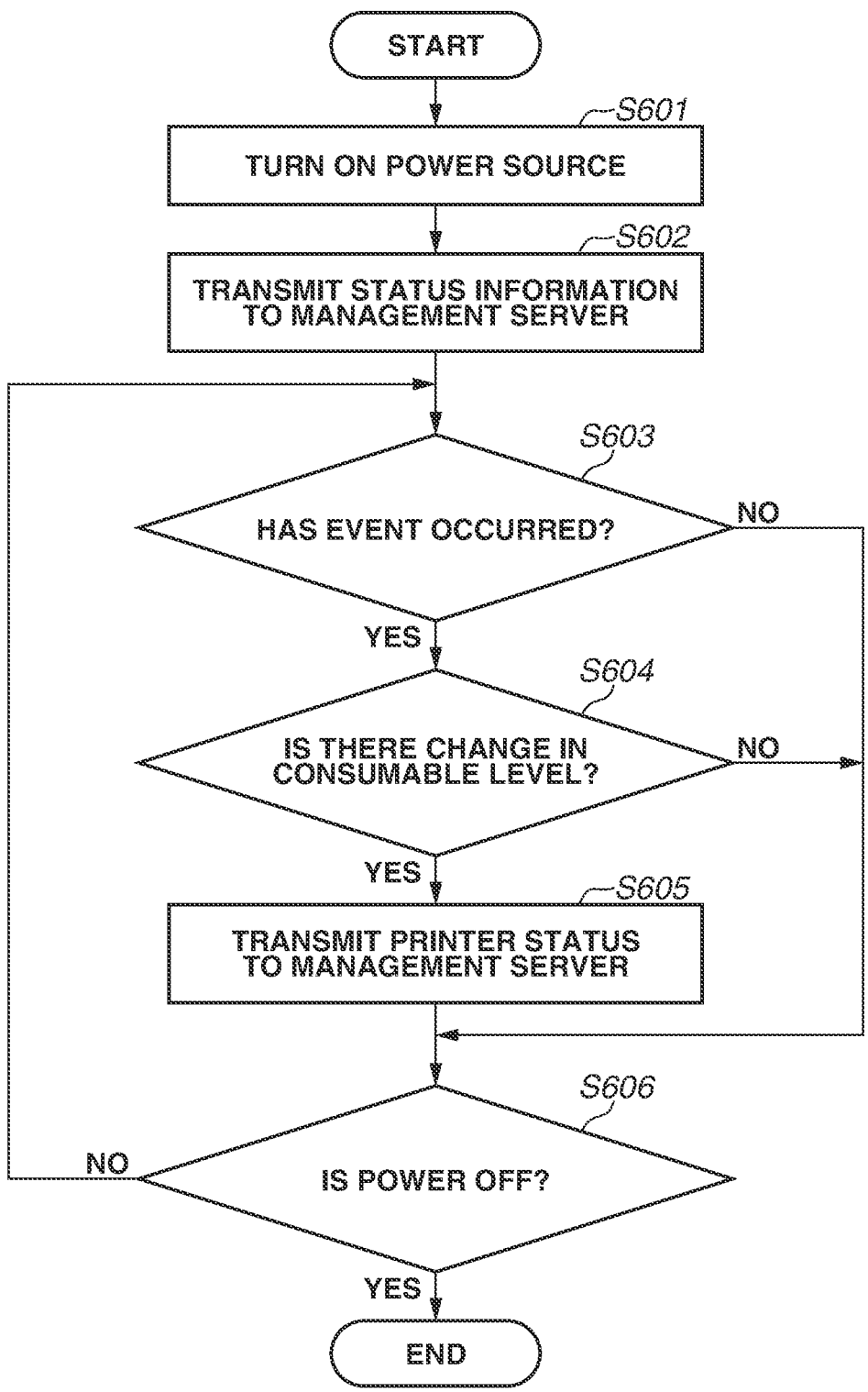
FIG. 6 is a flowchart illustrating a process by a printer.

FIG. 6 is a flowchart illustrating details of the processing of the printer 102 executed in 501. The CPU 305 of the printer 102 reads a program code stored on the program memory 306 and loads the program code onto the RAM, and thereby executes the loaded program code to perform the process of the flowchart illustrated in FIG. 6.

In S601, when the CPU 305 detects a press of a power button (not illustrated) of the printer 102, the CPU 305 turns on a power source.

In S602, the CPU 305 transmits the consumable information to the printer management server 103.

FIG. 7 illustrates an example of status information 700, which is the consumable information transmitted from the printer 102 to the printer management server 103. The status information 700 includes a serial number 701 and a model name 702 of the printer 102, a color 703 of each ink, a model number 704 of the ink cartridge, and an ink level 705 of the ink remained in the ink tank. The ink level 705 is calculated by using dot counting or sensor detection methods. Each ink level is specified on a 10-point scale of 0 to 100. An ink level of 0 indicates a state where there is no ink, whereas an ink level of 100 indicates a state where there is a full amount of ink. The rest of the flowchart in FIG. 6 will be described.

In S603, the CPU 305 checks whether an event has occurred. The term "event" refers to an occurrence of an operation, e.g., execution of printing or copying by the printer 102 or an operation of opening a cover of the printer 102.

In S604, the CPU 305 checks whether there is a change in ink level of any ink in the ink tanks of the printer 102. If there is a change in ink level of any ink remained in the ink tanks (YES in S604), the processing proceeds to S604. If there is no change (NO in S604), the processing proceeds to S605.

In S605, the CPU 305 transmits the status information 700 illustrated in FIG. 7 to the printer management server 103.

In S606, the CPU 305 checks the power state of the printer 102. If the power is still on (NO in S606), the processing returns to S603. In this way, the printer 102 transmits the status information 700 to the printer management server 103 at a timing when the power is turned on and a timing when an ink level changes after printing or copying is performed. The foregoing processing is the processing that is performed by the printer 102 in S501.

The rest of the sequence in FIG. 5 will be described.

In S502, the printer management server 103 checks each ink level included in the consumable information (status information) received from the printer 102. If the ink level is lower than a predetermined threshold value X, the processing proceeds to S503. The processing performed in S502 will be described in detail with reference to FIG. 8.

Figure 8:
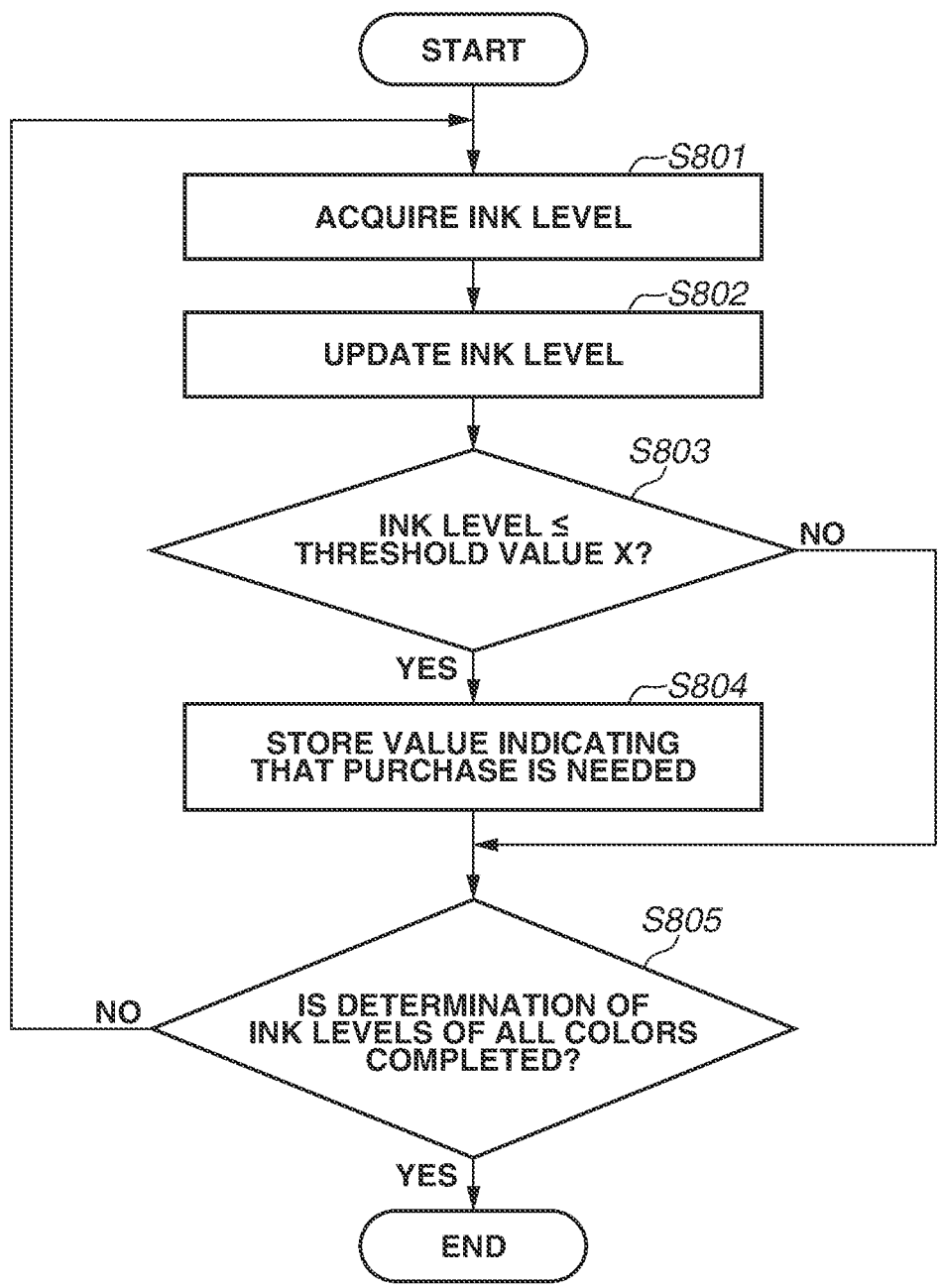
FIG. 8 is a flowchart illustrating a process by a management server.

FIG. 8 is a flowchart illustrating details of the processing performed by the printer management server 103 in S502. The CPU 201 of the printer management server 103 reads a program code stored on the disk apparatus 202 and loads the program code onto the RAM, and thereby executes the loaded program code to execute the process of the flowchart illustrated in FIG. 8. The flowchart illustrated in FIG. 8 is started when the printer management server 103 acquires the status information.

In S801, the CPU 201 acquires an ink level of a target color from the received status information.

In S802, the CPU 201 updates an ink level value of the target color stored in the database 413 of the printer management server 103 with the ink level value acquired in S801.

In S803, the CPU 201 determines whether the ink level is lower than or equal to the predetermined threshold value X. If the ink level is lower than or equal to the threshold value X (YES in S803), the processing proceeds to S804. If the ink level is higher than the threshold value X (NO in S803), the processing proceeds to S805. For example, in a case where the threshold value X is level 20, if the ink level is level 10, the ink needs to be purchased, so that the processing proceeds to S804.

In S804, a value indicating that the ink needs to be purchased is stored in the database 413 in the printer management server 103.

In S805, the CPU 201 determines whether the determination of the ink levels of all colors has been completed. If the determination of the ink levels of all colors is completed (YES in S805), the process ends. If the determination of the ink levels of all colors is not completed (NO in S805), the processing returns to S801.

The ink level determination in S502 is executed through the foregoing processing. The rest of the sequence in FIG. 5 will be described.

Figure 9:
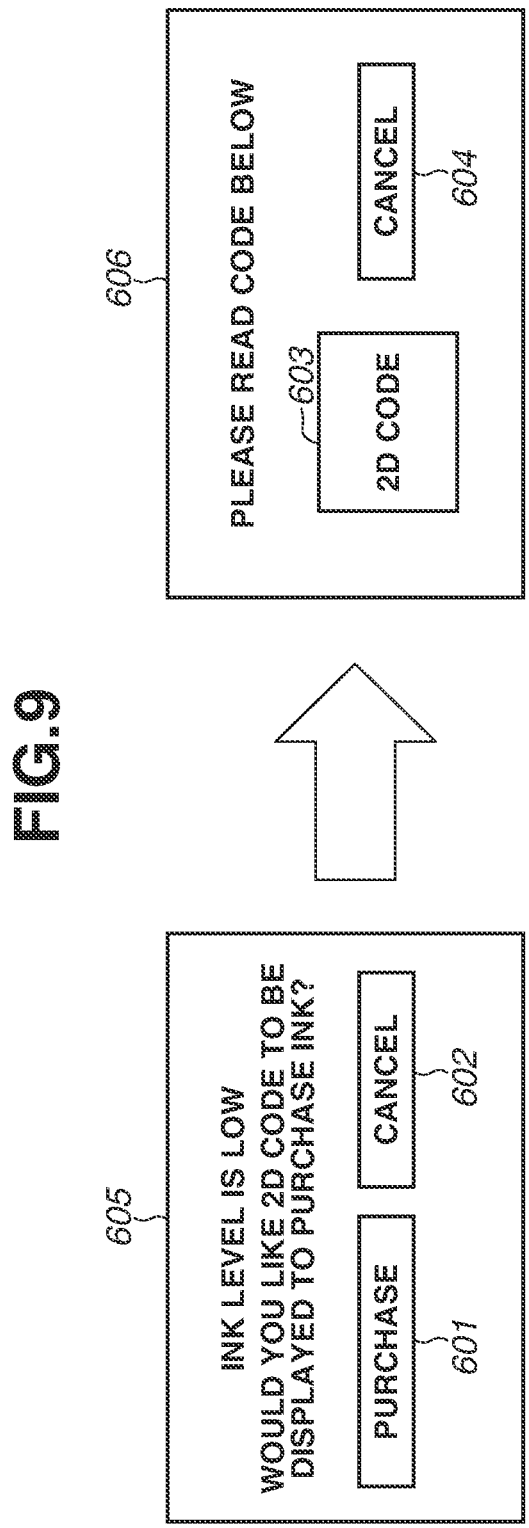
FIG. 9 is a diagram illustrating a screen transition on a display unit of a printer.

In S503, the printer management server 103 refers to the database 413 and determines whether there is an ink color for which the value indicating that the ink cartridge needs to be purchased is stored. If the value indicating that the ink cartridge needs to be purchased is stored, data of an ink purchase screen 605 illustrated in FIG. 9 is generated. If the value indicating that the ink cartridge needs to be purchased is not stored, the rest of the sequence is not performed.

In S504, the printer management server 103 transmits the generated data of the ink purchase screen 605 to the printer 102.

In S505, the printer 102 receives and displays the data of the ink purchase screen 605 on the display unit 308 using the web browser 317. The ink purchase screen 605 includes a purchase button 601 and a cancel button 602. With the purchase button 601, a user can input an instruction to purchase an ink cartridge through two-dimensional code payment. When the user selects the purchase button 601, the processing proceeds to S506. When the cancel button 602 is selected, the rest of the sequence is not performed. If the cancel button 602 is selected, the display unit 308 of the printer 102 is changed to a home screen.

In S506, the printer 102 transmits the purchase instruction to the printer management server 103.

In S507, the printer management server 103 receives the purchase instruction and transmits an ink purchase request to the sales company server 104. The ink purchase request contains the model number information about the ink cartridge used by the printer 102 and information indicating that the purchase uses two-dimensional code payment.

In S508, the sales company server 104 receives the ink purchase request and transmits a request to issue a universal resource locator (URL) for acquiring a two-dimensional code that is a payment code (hereinafter referred to as "URL for acquiring the two-dimensional payment code") to the payment server 105. The sales company has acquired an access URL for reaching the payment server 105 from a payment service company at the timing of subscription to the payment service. Thereby, the sales company server 104 transmits the request to issue the URL for acquiring the two-dimensional payment code to the payment server 105 based on the access URL. The request to issue the URL for acquiring the two-dimensional payment code includes information about the model number of the ink cartridge, a purchase price, a number of ink tanks to purchase, an order ID, and the currency type. These pieces of information are used for generating the two-dimensional code.

In S509, the payment server 105 receives the request to issue the URL for acquiring the two-dimensional payment code from the sales company server 104 and generates the two-dimensional payment code. Specifically, the payment server 105 generates the two-dimensional payment code based on the information about the model number of the ink cartridge, the purchase price, the number of ink tanks to purchase, the order ID, and the currency type contained in the received request to issue.

In S510, the payment server 105 transmits a URL that indicates a storage location of the generated two-dimensional payment code to the sales company server 104. In S510, the payment server 105 may transmit image data of the two-dimensional payment code in lieu of the storage location of the two-dimensional payment code. The image data may also be any information about the two-dimensional payment code.

In S511, the sales company server 104 receives the URL for acquiring the two-dimensional payment code from the payment server 105, and transmits the URL for acquiring the two-dimensional payment code to the printer management server 103.

In S512, the printer management server 103 receives the URL for acquiring the two-dimensional payment code from the sales company server 104. The printer management server 103 then accesses the URL for acquiring the two-dimensional payment code, acquires the two-dimensional payment code, and generates a two-dimensional code payment screen 606 illustrated in FIG. 9 using the acquired two-dimensional payment code. In the case where the payment server 105 transmits the image data of the two-dimensional payment code in S510, a two-dimensional code payment screen is generated using the image data.

In S513, the printer management server 103 transmits data of the generated two-dimensional code payment screen to the printer 102.

In S514, the printer 102 acquires the two-dimensional code payment screen and displays the two-dimensional code payment screen on the display unit 308 using the web browser 317. The two-dimensional code payment screen 606 illustrated in FIG. 9 contains a two-dimensional code 603 and a cancel button 604. The two-dimensional code 603 is code information that can be read by the user with the camera unit 210 using an application installed in a terminal, such as a smartphone. If the cancel button 602 is pressed by the user, the rest of the sequence is not performed. If the cancel button 602 is pressed, the display unit 308 of the printer 102 is changed to the home screen.

In S515, the smartphone 101 reads, based on a user operation, the two-dimensional code 603 with the camera unit 210 using a two-dimensional code payment application, which is one of the applications 212 stored on the disk apparatus 202.

In S516, the smartphone 101 transmits a payment information request to the payment server 105 using the two-dimensional code payment application.

Figure 10:
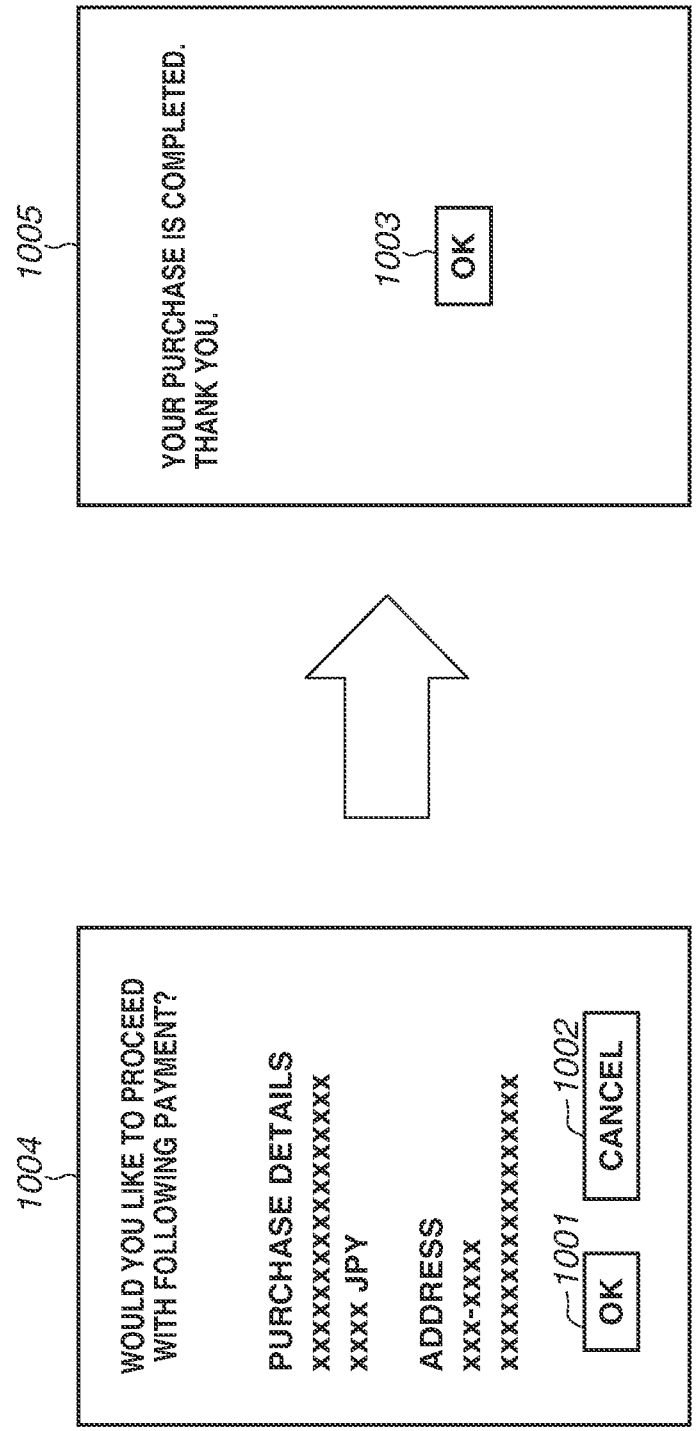
FIG. 10 is a diagram illustrating a screen transition of a two-dimensional code payment application according to the first exemplary embodiment.

In S517, the payment server 105 receives the payment information request and generates a payment confirmation screen 1004 illustrated in FIG. 10.

In S518, the payment server 105 transmits data of the generated payment confirmation screen 1004 to the smartphone 101. At this time, the payment server 105 may transmit the data of the payment confirmation screen 1004 to the printer 102 in lieu of the smartphone 101.

In S519, the smartphone 101 displays the received payment confirmation screen 1004 on the display unit 205 of the smartphone 101 using the two-dimensional code payment application. In the case where the printer 102 receives the payment confirmation screen 1004, the printer 102 may display the payment confirmation screen 1004. The payment confirmation screen 1004 includes purchase information about the color and model number of an ink cartridge to be purchased and the purchase price. The payment confirmation screen 1004 further includes pre-registered delivery destination information, an OK button 1001, and a cancel button 1002. For the delivery destination information, the information that has been registered by the user at the payment service registration is used. If the OK button 1001 is pressed by the user, the processing proceeds to a next operation. If the cancel button 1002 is pressed, the rest of the sequence is not performed. In the case where the cancel button 1002 is pressed, the screen of the smartphone 101 is changed to a home screen or top screen of the two-dimensional code payment application.

In S520, in response to the press of the OK button 1001 on the payment confirmation screen 1004, the smartphone 101 transmits payment confirmation information to the payment server 105 using the two-dimensional code payment application.

In S521, the payment server 105 receives the payment confirmation information and generates a payment completion screen 1005 illustrated in FIG. 10.

In S522, the payment server 105 transmits data of the generated payment completion screen 1005 to the smartphone 101. At this time, the payment server 105 may transmit the data of the generated payment completion screen 1005 to the printer 102 in lieu of the smartphone 101.

In S523, the smartphone 101 receives and displays the data of the payment completion screen 1005 on the display unit 205 of the smartphone 101. If the printer 102 receives the data of the payment completion screen 1005, the printer 102 may display the payment completion screen 1005.

In S524, the payment server 105 transmits payment information to the sales company server 104. The payment information includes information about a name, email address, telephone number, and delivery destination of the purchaser and information about the model number of the purchased ink cartridge. For the name, email address, and telephone number of the purchaser, the information that has been registered by the user at the payment service registration is used.

As described above, according to the present exemplary embodiment, a two-dimensional payment code is displayed on a display unit of a printer based on information about a state of a consumable item. The displayed two-dimensional code is read by a payment application, and thereby an appropriate ink is purchased with ease.

In the present exemplary embodiment, a plurality of payment servers 105 may be registered in advance for a use of a plurality of payment services in each of the printer management server 103 and the sales company server 104. In this case, a user may select a payment service with use of the operation unit 309 and communicate with a payment server 105 corresponding to the selected payment service.

Next, a second exemplary embodiment will be described. In the present exemplary embodiment, a printer 102, which is an image processing apparatus, performs functions of a printer management server 103 according to the first exemplary embodiment. Only differences will be described below, and similarities to the first exemplary embodiment will be omitted.

FIG. 11 is a purchase sequence diagram according to the second exemplary embodiment. In S1101, the printer 102 checks an ink level of the printer 102. In the present exemplary embodiment, the printer 102 detects a change in the ink level of the printer 102 through the processing executed in S601 to S603 illustrated in FIG. 6 according to the first exemplary embodiment. In the processing, only when there is a change in the ink level, the detected ink level and a predetermined threshold value X are compared and determined. Specifically, the processing performed by the printer management server 103 described in S801 to S805 in FIG. 8 according to the first exemplary embodiment is performed by the printer 102. In other words, the printer 102 determines whether the ink level of a target color stored in a database in the printer 102 is lower than or equal to the predetermined threshold value X. If the ink level is lower than or equal to the threshold value X, the value indicating that an ink cartridge needs to be purchased is stored in the database.

In S1102, the printer 102 generates an ink purchase screen. Specifically, the printer 102 refers to the database included in the printer 102, and determines whether there is an ink color for which the value indicating that an ink cartridge of the ink color needs to be purchased is stored. If the value indicating that an ink cartridge needs to be purchased is stored, data of the ink purchase screen 605 illustrated in FIG. 9 is generated. In S505, the ink purchase screen 605 is displayed based on the data of the generated ink purchase screen 605. The ink purchase screen 605 is configured to receive user-designation of the purchase button 601 as described in the first exemplary embodiment.

In S1103, based on the user-designation of the purchase button 601, the printer 102 transmits a purchase instruction to a sales company server 104. Thereafter, S508 to S510 are performed as described in the first exemplary embodiment.

In S1104, the sales company server 104 transmits a URL for acquiring a two-dimensional payment code to the printer 102.

In S1105, the printer 102 receives the URL for acquiring the two-dimensional payment code from the sales company server 104. The printer 102 then accesses the URL for acquiring the two-dimensional payment code, acquires the two-dimensional payment code, and generates the two-dimensional code payment screen 606 illustrated in FIG. 9 using the acquired two-dimensional payment code. In a case where the payment server 105 transmits image data of the two-dimensional payment code in S510, a two-dimensional code payment screen is generated using the image data. The rest of the sequence is similar to that described in the first exemplary embodiment.

As described above, according to the present exemplary embodiment, a user can complete purchasing of an appropriate consumable item without using the printer management server 103 only by using a payment application and reading a two-dimensional payment code displayed on the printer 102.

With the present disclosure, convenience in consumable purchase improves.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

What is claimed is:

1. A system comprising:
   a printer;
   a management server;
   a sales company server; and
   a payment server,
   wherein the printer, the management server, the sales company server, and the payment server communicate using internet network communication,
   wherein the printer includes a display; and a first transmission unit configured to transmit information about print operation performed by the printer to the management server, and
   wherein the management server includes:
   a first generation unit configured to generate information of a first screen about pricing of the print operation, based on the information about the print operation transmitted from the printer and based on information of the pricing of the print operation that was obtained from the sales company server;
   a second transmission unit configured to transmit, to the sales company server, a request for payment of the pricing of the print operation, based on a user instruction given on the first screen displayed on the display of the printer; and
   a second generation unit configured to, based on information about a payment code generated by the payment server based on the request for payment, generate information of a second screen including the payment code,
   wherein, in a case where the payment code is read by an information processing apparatus in a state in which the printer displays the second screen on the display, a payment confirmation screen is displayed on the information processing apparatus as a next screen after the second screen, and the payment finishes based on a user instruction given on the payment confirmation screen.

2. The system according to claim 1,
   wherein the information about the print operation is information about a consumable item having been used by the printer.

3. The system according to claim 2,
   wherein the management server further includes a determination unit configured to perform determination about a remaining amount of the consumable item based on the information about the consumable item transmitted from the printer, wherein, in a case where the determination unit determines that the remaining amount of the consumable item is less than a predetermined threshold value, the first generation unit generates the information of the first screen, and wherein, in a case where the determination unit does not determine that the remaining amount of the consumable item is less than the predetermined threshold value, the first generation unit does not generate the information of the first screen.

4. The system according to claim 2, wherein the first transmission unit transmits identification information about the consumable item together with the information about the consumable item, and wherein, when the second transmission unit transmits a request for payment of the pricing of the consumable item, the second transmission unit transmits the request together with the identification information about the consumable item that is transmitted from the first transmission unit.

5. The system according to claim 4, wherein a sales management server having received the request for payment of the pricing of the consumable item transmits an issuance request about the payment code to a payment server, the issuance request containing the identification information about the consumable item and information about a price.

6. The system according to claim 1, wherein the payment server having received an issuance request about the payment code generates the payment code and transmits information about the payment code.

7. A printer comprising:

a display;

one or more processors; and one or more memories storing instructions that, when executed by the one or more processors, cause the printer to perform operations including:

displaying, on the display, a first screen about pricing of the print operation, based on information about a print operation performed by the printer and based on information of the pricing of the print operation that was obtained from a sales company server;

transmitting, to the sales company server, a request for payment of the pricing of the print operation, based on a user instruction designated on the first screen; and displaying, on the display, based on information about a payment code generated by a payment server based on transmitting the request for payment, a second screen including the payment code, wherein, in a case where the payment code is read by an information processing apparatus in a state in which the second screen is displayed, a payment confirmation screen is displayed on the information processing apparatus as a next screen after the second screen, and the payment finishes based on a user instruction given on the payment confirmation screen.

8. The printer according to claim 7, wherein the information about the print operation is information about a consumable item having been used by the printer.

* * * * *